March 4, 1969     J. E. BENNETT ET AL     3,430,609
SYSTEM FOR DETECTING AN ABNORMAL OPERATING CONDITION
Filed Oct. 20, 1967
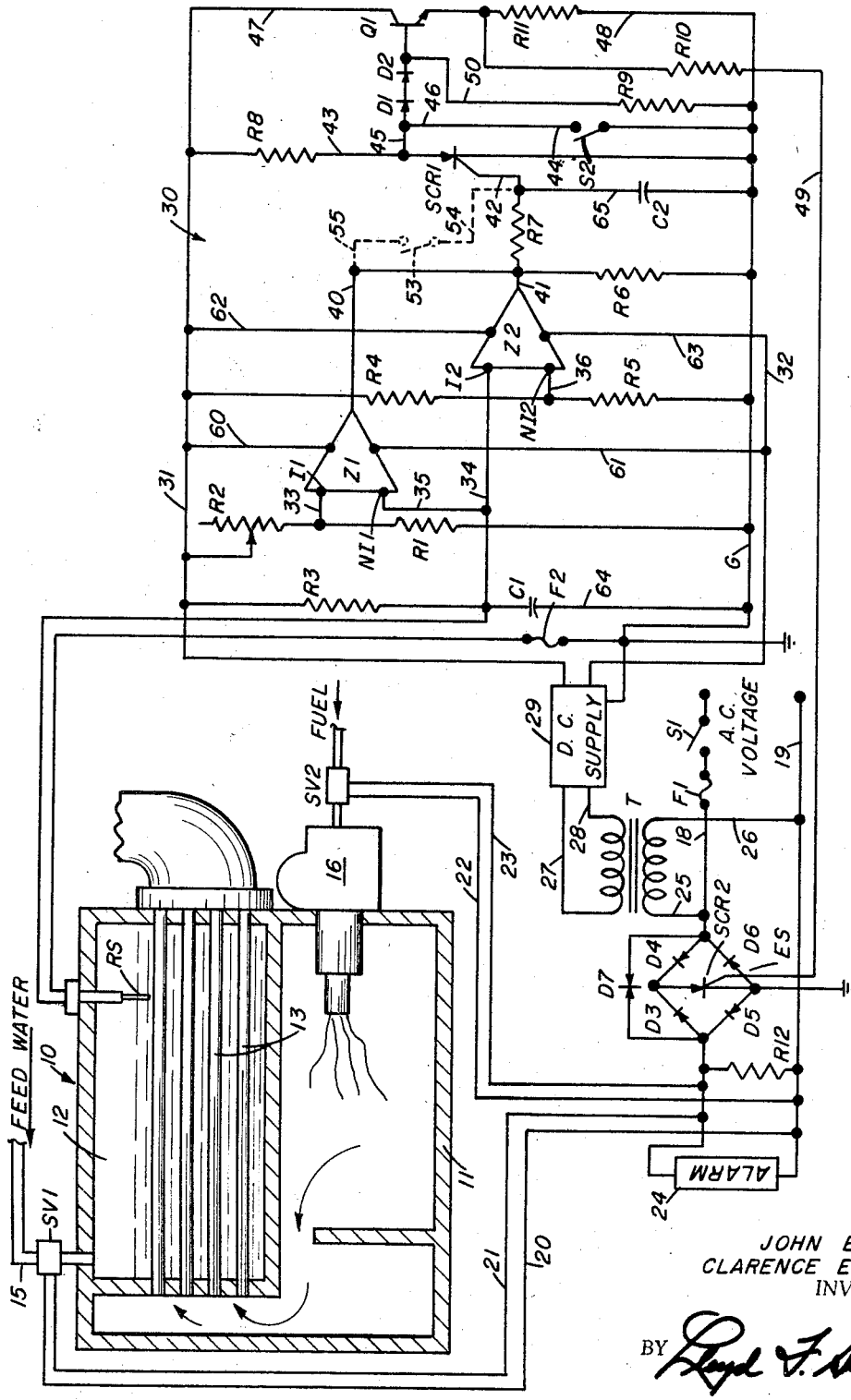
JOHN E. BENNETT
CLARENCE E. BENNETT
INVENTORS
BY *Lloyd F. Auerbach*
AGENT United States Patent Office 3,430,609
Patented Mar. 4, 1969

3,430,609
SYSTEM FOR DETECTING AN ABNORMAL
OPERATING CONDITION
John E. Bennett, 4395 White Acres Road, Clarence, N.Y.
14031, and Clarence E. Bennett, 149 Burlington Ave.,
Rochester, N.Y. 14619
Filed Oct. 20, 1967, Ser. No. 676,797
U.S. Cl. 122—448                                        14 Claims
Int. Cl. F22b 37/42; F22d 5/26

ABSTRACT OF THE DISCLOSURE

A system by which a preset condition, such as abnormal temperature, pressure, etc. within an element can be detected so that a device to which the element is responsive can be positively shut down until the condition has been corrected. The system includes a pair of differential amplifiers, the inputs of which are interconnected to a number of voltage divider circuits for establishing a common output signal only when the abnormal condition is detected by a sensor forming a leg of one of the voltage divider circuits. A manual reset is provided and the circuitry of the system embodies fail-safe features to ensure reliable operation.

Field of the invention

This invention relates to a system for detecting an abnormal operating condition, and more particularly to an improved system by which a preset condition, such as abnormal temperature, pressure, etc. within an element, can be immediately detected and a generating device to which the element is responsive can be positively shut down until the condition causing the preset condition has been corrected.

Description of the prior art

In the field of temperature control, there has been a need for a system which quickly and accurately determines or detects a maximum and/or minimum operating condition that is indicative of any one of a number of operating conditions, and which will immediately shut down and/or lock out a generating device until such condition has been corrected. For example, a heat generating device or system, such as a boiler, can be ruined or can even explode if operated under a low water condition. Such a condition can occur due to leakage in the system, faulty check valves, relief valve failure because of overfiring, draining the boiler for repairs and not refilling before refiring the boiler, or any combination of such conditions. Controls have been devised to monitor such faulty operating conditions and are primarily of the electro-mechanical type, such as float-activated switches. Sludge accumulation and corrosion can cause the linkages to operate spasmodically or to stick in a position such that the control is no longer indicative of the condition, or even completely inoperative. As a result, there is no assurance that the control system will always indicate the actual condition that exists so it can be corrected before any damage occurs.

Summary of the invention

The invention relates to a system comprising a sensor that is positioned in proximity to or within an element in which a preset condition is to be detected or measured and an electrical circuit which provides a system with fail-safe features. At this point, it may be best to point out that the system can be used for determining a preset temperature, pressure, or any other condition within an enclosure, such as a room, a boiler tank, a boiler tube, a refrigerator, etc., so that the term "element" as used herein is meant to include any one of the aforementioned or similar enclosures. Also, the temperature, pressure or other condition can be one dependent on heat or cold so that the term "generating device" as used herein is meant to include a "cold or heat generating device," such as a refrigerating or a heating device. As noted hereinbelow, the invention is described in detail with respect to a boiler system, but the scope of the invention is defined by the appended claims.

The electrical circuit mentioned above comprises a pair of differential amplifiers having their outputs interconnected so as to provide a single output signal irrespective of which amplifier generates the signal. The input signals to the amplifiers are derived from a group of three voltage dividers. One voltage divider circuit, which includes the sensor as one leg, supplies a limiting voltage to each amplifier. A second voltage divider circuit which includes a variable resistance that can be preset as a function of the condition to be detected supplies to one of the amplifiers a reference voltage that is greater than the limiting voltage. A third voltage divider supplies to the other amplifier a control voltage that is less than the limiting voltage. Under normal operating conditions, the output signal from the amplifiers will be low-zero or negative so that the following circuitry will function in a normal manner to maintain continuous operation of a heat-generating device.

When either amplifier generates a positive signal, the following circuitry is shut down which results in shut down and lock out of the heat generating device. A manual reset means permits normal operation to be resumed, provided the condition causing the shut down has been corrected. Otherwise, operation is inhibited until such correction has been made. The following circuitry is fail-safe to the extent that normal operation cannot be resumed if the sensor has been shorted or the reset switch is held or remains closed due to foreign material causing a short circuit across the reset switch contacts. From the description which follows it will be apparent that the system disclosed herein is free of any corrosion problems and is fully operable under conditions that might be adverse to an electro-mechanical system.

One object of the invention is to provide an improved operation detection system that is reliable under all operating conditions.

Another object of the invention is to provide an improved operation detection system that is fully responsive to a preset abnormal operating condition within a very small tolerance to initiate full shut-down of a generating device.

Still another object of the invention is to provide an improved temperature detection system that is to a high degree fail-safe upon resetting after a preset abnormal temperature condition has been sensed or detected.

And yet another object of the invention is to provide an improved temperature detection system that can be readily adapted for use under varied conditions, is fully responsive to an abnormal operating condition and is reliable in operation.

Other objects and advantages of the invention will be apparent to those skilled in the art by the more detailed description which follows.

Description of the drawing

Reference is now made to the accompanying drawing which is a diagrammatic presentation of a hot water or steam boiler system and a schematic wiring diagram associated therewith wherein like reference numerals and characters designate like parts.

Description of a preferred embodiment of the invention

In the embodiment of the invention about to be described a heat generating device 10 is disclosed schematically as a steam boiler of the well-known fire-tube type.

However, as described above, the invention can be applied and readily adapted for determining a preset temperature, pressure or other condition within a room heated by a gas or oil, fired, steam or convection type furnace; within some part of a furnace, such as the bonnet; within an enclosure cooled by a refrigerating unit; etc.

The heat generating device 10 comprises an enclosure 11 within which a water tank 12 is arranged with a nest of tubes 13 passing therethrough as shown schematically in the drawing, the tubes 13 conducting the hot flue gases to a stack in a well known manner. Feed water is supplied to tank 12 by a pipe 15, the flow of water being controlled by a solenoid valve SV1. Heat is generated by an oil or gas burner 16 which is connected by pipe 17 to a supply tank or fuel source in a well known manner, the flow of oil or gas being controlled by a solenoid valve SV2. Valves SV1 and SV2 are connected across lines 18 and 19, which are connected to an A.C. source of potential, by lines 20, 21 and 22, 23, respectively. Line 18 is provided with a main switch S1 and a fuse F1, an alarm or indicator 24 being connected across lines 18, 19 to normally designate a "GO" condition. A transformer T has its primary winding connected across lines 18, 19 by lines 25, 26 and its secondary winding connected by lines 27, 28 to an A.C.-to-D.C. converter 29 which supplies a regulated D.C. voltage to circuitry 30 via lines 31, 32. An electronic switch ES is connected in line 18 and its function will be described in more detail hereinbelow.

Means for maintaining the device 10 in an operative condition comprises an electronic switch ES which is connected in line 18. Switch ES includes diodes D3, D4, D5 and D6 to provide paths for current flow during both the positive and negative portions of the A.C. primary voltage. A silicon controlled rectifier SCR2 is connected across D3, D5 and D4, D6 to provide a common path. Rectifier SCR2 switches on at the beginning of each half cycle of A.C. primary voltage and conducts load current. Resistor R12, which is connected across lines 18, 19 supplies a minimum required current to insure switching of SCR2 in the event of very light loads, or highly inductive loads. Diode D7 is a selenium device consisting of two back-to-back diodes connected across diodes D3, D4. If the peak voltage should exceed a predetermined limit, somewhat above the normal A.C. peak voltage, diode D7 will switch to a low resistance state very rapidly. In this manner, diode D7 will limit high voltage surges which could occur with inductive loads and thereby serves to protect switch ES. Fuse F1 also protects switch ES from any load short circuit.

Preset means for establishing a reference voltage output as a function of a preset temperature condition comprises a voltage divider circuit which includes a fixed resistor R1 and an adjustable resistor R2 connected across line 31 and ground line G, the junction line 33 being connected to the inverting terminal I1 of a differential amplifier Z1. Resistor R2 can be preset to a position which corresponds to a desired temperature condition and a suitable calibrated scale, not shown, can be provided so that the setting can be actually made in terms of temperature, that is, degrees Fahrenheit or centigrade.

Sensor means for normally manifesting the temperature within water tank 12 comprises a resistor RS and a fixed resistor R3 which also form a voltage divider circuit across lines G, 31. The resistor RS comprises a platinum wire resistor arranged in the tip of a stainless steel protective tube from which it is completely insulated. The resistor RS is located in proximity (about ¼ inch) to the highest tube in tank 12. In this location, resistor RS is close enough to respond rapidly to any variations in water temperature. An excessive temperature can occur if the boiler is fired dry or the water level drops below the normal operating level. Resistor RS manifests an increase in resistance with temperature rise that is extremely stable and responsive. The junction of the voltage divider comprising RS, R3 is connected by line 34 to the inverting terminal I2 of a differential amplifier Z2 and by line 35 to the noninverting terminal NI1 of amplifier Z1. The voltage derived from resistors RS, R3, under normal operating conditions, is lower than the aforementioned reference voltage and varies in accordance with the temperature at the sensor location. Since this voltage is representative of the temperature at the sensor location, it can only approach the limit of the reference voltage and is, therefore, designated as a limiting voltage.

Control means for providing a control voltage that is less than the aforementioned limiting voltage comprises a voltage divider circuit including resistors R4, R5 connected across lines G, 31, the junction point of which is connected by line 36 to the noninverting terminal NI2 of amplifier Z2. This cotrol voltage is lower than the limiting voltage derived from resistors RS, R3.

Amplifier means comprises a pair of differential amplifiers Z1 and Z2, each of which has, respectively, an inverting input terminal I1 and I2 and a non-inverting input terminal NI1 and NI2 which are connected to the voltage divider circuits as described hereinabove. The amplifiers Z1 and Z2 are connected across lines 31, 32 by lines 60, 61 and 62, 63, respectively. The output signal from amplifier Z1 is coupled by line 40 to the output line 41 of the amplifier Z2, the common output being interconnected to the junction point of a voltage divider circuit comprising resistors R6, R7, resistor R6 being connected to ground line G and resistor R7 being connected to the gate of the silicon controlled rectifier SCR1 via line 42.

When the temperature of the water is normal, the voltages transmitted to amplifiers Z1 and Z2 are as described above and the output voltage of each amplifier is zero or slightly negative. Under such a condition, the voltage across resistors R6, R7 is also zero or slightly negative. If an abnormal condition arises that causes the temperature of the water to rise above the preset temperature condition, the voltage derived from resistors RS, R3 will exceed that derived from resistors R1, R2 and amplifier Z1 will produce a positive voltage at the junction of R6, R7. If an abnormal condition should cause the voltage derived from RS, R3 to fall below that of R4, R5, then amplifier Z2 will produce a positive voltage at the junction of R6, R7. Amplifiers Z1 and Z2 can only generate a positive voltage if the input signal to their respective noninverting terminals NI1, NI2 goes more positive than the signal to their respective inverting terminals I1, I2. If an output signal from each of amplifiers Z1, Z2 is low, the combined output signal is low. If an output signal from one or both of amplifiers Z1, Z2 is high, the combined output signal is high.

By means of the circuitry described thus far, various fail-safe conditions are ensured. For example, if resistor R2 should become electrically open, the RS, R3 voltage will exceed that of R1, R2 and a positive voltage will be derived from amplifier Z1. If the sensor lead wire insulation should abrade or deteriorate to the extent that resistor RS would short circuit, then the RS, R3 voltage would be less than that of R4, R5 and a positive voltage will be derived from amplifier Z2. Also, if the sensor should short circuit to its protective tube for any reason, the resultant current will open fuse F2, the voltage RS, R3 would exceed that of R1, R2 and the amplifier Z1 will produce a positive voltage. It should be pointed out at this time that resistors R6 and R7 are selected to provide the required triggering current and voltage to rectifier SCR1. Also, capacitors C1 and C2 connected, respectively, via lines 64 and 65 between lines 34, 42 and ground line G are provided as filters to insure that rectifier SCR1 will not be triggered by any electromagnetic interference.

Means responsive to the voltage output from the amplifiers Z1 and Z2 for disconnecting the electronic switch ES comprises the rectifier SCR1 and a current amplifier Q1. Rectifier SCR1 acts as a latching device which, so long as the voltage across R6, R7 remains at zero or negative volts, provides an open circuit and has no effect on the following circuitry. Resistor R7 is connected to the gate of rectifier SCR1 by line 42. The anode of rectifier SCR1 is connected to line 31 via line 43 and resistor R8, whereas the cathode is connected to ground line G by line 44. The anode of rectifier SCR1 is also connected via line 45 and diodes D1, D2 to the base of amplifier Q1. A reset switch S2 is connected between line 45 and ground line G before diodes D1 and D2 by line 46. The collector of amplifier Q1 is connected to line 31 by line 47 and the emitter is connected to ground line G via resistor R11 and line 48 and to the gate of rectifier SCR2 via resistor R10 and line 49.

Resistor R8, diodes D1, D2 and resistor R9 in line 50 are selected to supply the proper base current to amplifier Q1 so that it will be turned on when SCR1 is in an open state. When SCR1 is latched in the closed state, the voltage drop across D1, D2 insures that amplifier Q1 cannot turn on. Amplifier Q1 supplies trigger current to rectifier SCR2 and resistors R10, R11 are selected to provide the proper current and voltage.

Rectifier SCR1 acts as a latching device as mentioned above. So long as the voltage across R6, R7 remains at zero or slightly negative, rectifier SCR1 provides an open circuit and has no effect on amplifier Q1 or subsequent circuitry. When the voltage across R6, R7 becomes positive due to any of the conditions described above, rectifier SCR1 switches regeneratively to a near short circuit and disables the succeeding circuitry. Amplifier Q1 is then turned off as well as switch ES, thereby disabling valves SV1 and SV2 and shutting down the device 10. Subsequent to switching, if the voltage across R6, R7 returns to zero or a negative state, rectifier SCR1 remains latched or in its near short circuit state.

Reset means comprising switch S2 serves to return the circuitry to its normal condition. On closing switch S2 momentarily, if the voltage across R6, R7 is at zero or negative state when switch S2 is released, rectifier SCR1 returns to its open circuit state and the system is again operative. Switch S2 is fail-safe, that is, if it should stick in its closed position or is short circuited by foreign material, the circuitry remains disabled as if rectifier SCR1 had been latched.

In the event of an electric power failure following a condition causing rectifier SCR1 to latch, protection is maintained. When power is restored, normal operation can be resumed because rectifier SCR1 is in its open circuit state, provided the condition has been corrected. If the condition is not corrected, rectifier SCR1 immediately relatches to hold the device 10 in an inoperative condition.

If lockout of device 10 is not required, resistor R7 can be shorted out. Rectifier SCR1 will not latch without a series base resistance. With this arrangement, an on-off demand control is obtained, for example, a thermostatic control. In the event both modes of operation are required or desired on a selective basis, a single throw, single pole switch 53 can be used as shown by the dotted lines in the drawing. The arm of switch 53 is connected by line 54 to the junction of resistor R7 and capacitor C2, the pole being connected to the junction of resistors R6, R7 via line 55. With either mode of operation, the same advantages discussed above are retained.

It will be apparent to one skilled in the art that any type of sensor can be used in conjunction with the aforementioned circuitry so long as its output can be converted to a voltage indicative of the condition to be detected. The invention is not to be limited to the use of one sensor because the system can be expanded so as to control on the basis of the other factors or conditions in addition to temperatures, such as pressure. For example, a pressure sensor can operate in conjunction with circuitry similar to that described up to and including another pair of differential amplifiers, the output of the amplifiers being interconnected with that of Z1 and Z2 to provide another voltage control condition for operating rectifier SCR1 as already described. Such a logical extension would then provide fail-safe temperature limit preset and fail-safe pressure limit preset, as well as lockout upon short circuit of either sensor, fail-safe reset, contactless lockout and contactless actuation of the control devices. Obviously, the system can be extended so as to respond to any one of a number of preset conditions.

The control voltage limit can be made adjustable in a fail-safe manner by replacing resistor R5 with a variable resistor. If the contact-element junction of the variable resistor becomes electrically open, voltage R4, R5 would exceed voltage R5, R3 so that amplifier Z2 would produce a positive voltage, thereby causing lockout as described above.

The invention has been described in detail with particular reference to a preferred embodiment thereof, but it will be understood that variations and modifications can be effected within the spirit and scope of the invention as described hereinabove and as defined in the appended claims.

We claim:

1. A system for detecting at least one preset operating condition within an element responsive to a generating device, comprising in combination:
   a source of potential;
   means interconnected to said source of potential for maintaining said device operative;
   preset means interconnected with said source of potential for establishing a reference voltage output as a function of said preset operating condition;
   sensor means arranged in proximity to said element and interconnected to said source of potential for normally providing a limiting voltage output that is lower than said reference voltage output and that varies in accordance with the operating condition of said device;
   control means connected across said source of potential for providing a control voltage that is less than said limiting voltage;
   amplifier means responsive to said reference voltage, said limiting voltage and said control voltage for providing an output voltage when said limiting voltage exceeds said reference voltage or is less than said control voltage; and
   means responsive to said output voltage for disconnecting said maintaining means from said source of potential.

2. A system in accordance with claim 1 including means for reconnecting said maintaining means to said source of potential.

3. A system in accordance with claim 1 wherein said preset means comprises a voltage divider circuit, one leg of which includes an adjustable resistance for establishing said reference voltage.

4. A system in accordance with claim 1 wherein said sensor means comprises a voltage divider circuit, one leg of which includes a member whose resistance varies as a function of an operating condition.

5. A system in accordance with claim 1 wherein said control means comprises a voltage divider circuit.

6. A system in accordance with claim 1 wherein said amplifier means comprises a pair of differential amplifiers, each of said amplifiers having an inverting and a non-inverting input terminal, said reference voltage being interconnected to the inverting input terminal of one amplifier, said limiting voltage being interconnected to the non-inverting input terminal of said one amplifier and the inverting input terminal of the other amplifier, and the control voltage being connected to the non-inverting input terminal of said other amplifier.

7. A system for determining a preset temperature condition within an element responsive to a heat generating device; comprising in combination:

a source of A.C. potential;

means interconnected with said source of A.C. potential for regulating said device and including an electronic switch;

means interconnected with said source of A.C. potential for converting the latter to D.C. potential;

preset means interconnected with said D.C. potential for establishing a reference voltage output as a function of said preset temperature condition;

sensor means arranged in proximity to said element and interconnected with said D.C. potential for normally providing a limiting voltage output that is lower than said reference voltage output and varies in accordance with the temperature within said element;

control means interconnected with said D.C. potential for providing a control voltage that is less than said limiting voltage;

amplifier means responsive to said reference voltage, said limiting voltage and said control voltage for providing an output voltage when said limiting voltage exceeds said reference voltage or is less than said control voltage;

actuating means having a first state for normally maintaining said electronic switch under circuit operable conditions and a second state responsive to said output voltage for disabling said electronic switch to disconnect said source of A.C. potential from said device; and means for resetting said actuating means to said first state only under a normal circuit operable condition.

8. A system in accordance with claim 7 wherein said preset means comprises a voltage divider circuit, one leg of which includes an adjustable resistance for establishing said reference voltage.

9. A system in accordance with claim 7 wherein said sensor means comprises a voltage divider circuit, one leg of which includes a heat-sensitive member whose resistance varies as a function of temperature.

10. A system in accordance with claim 7 wherein said control means comprises a voltage divider circuit.

11. A system in accordance with claim 7 wherein said amplifier means comprises a pair of differential amplifiers, each of said amplifiers having an inverting and a non-inverting input terminal, said reference voltage being interconnected to the inverting input terminal of one amplifier, said limiting voltage being interconnected to the non-inverting input terminal of said one amplifier and the inverting input terminal of the other amplifier, and said control voltage being connected to the non-inverting input terminal of said other amplifier.

12. A system in accordance with claim 7 wherein said actuating means comprises a silicon controlled rectifier responsive to said output voltage and a current amplifier whose output is coupled to said electronic switch.

13. A system in accordance with claim 7 wherein said resetting means comprises a manually operable switch that returns said actuating means to its first state only when said output voltage is zero or of negative polarity.

14. A system in accordance with claim 7 including circuit means for maintaining said actuating means in said second state independently of said resetting means until a normal circuit operable condition has been established.

References Cited

UNITED STATES PATENTS

| 2,449,538 | 9/1948 | Ackerman | 122—504 |
| 3,042,007 | 7/1962 | Chien et al. | 122—448 |

KENNETH W. SPRAGUE, *Primary Examiner.*

U.S. Cl. X.R.

122—504